D. WILSON.
NUT LOCK.
APPLICATION FILED AUG. 20, 1908.
915,642.
Patented Mar. 16, 1909.
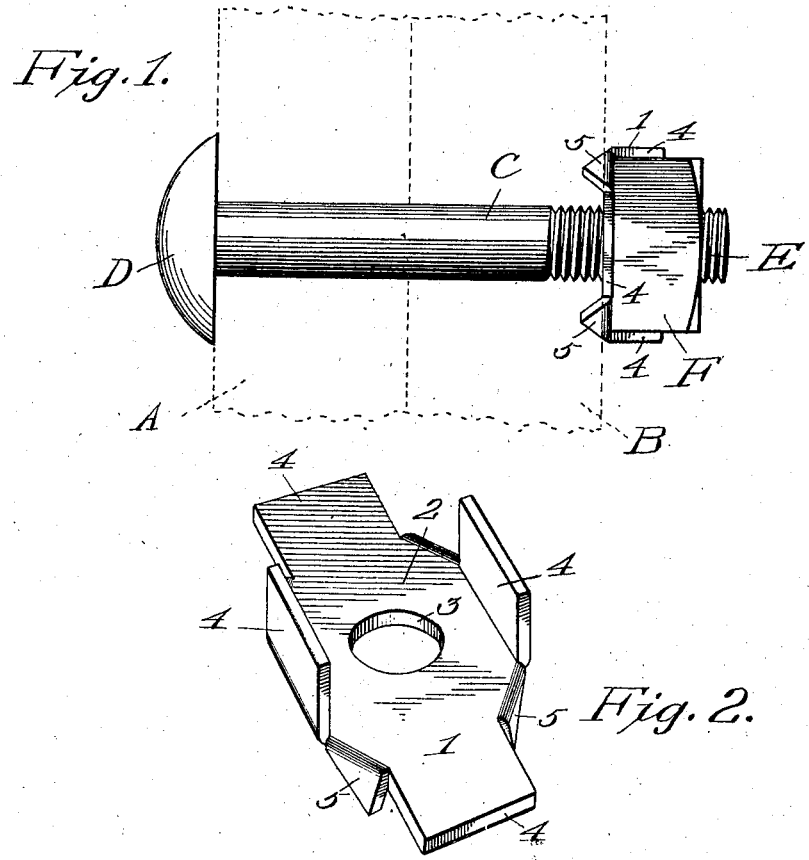
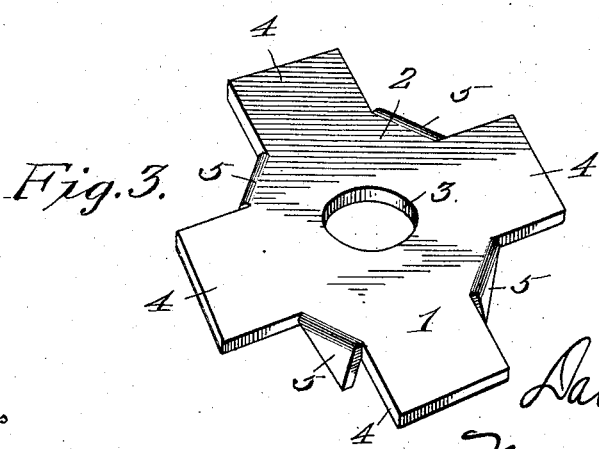
Witnesses
James F. Crown
N. F. McInay
Inventor
David Wilson
By Watson E. Coleman
Attorney

UNITED STATES PATENT OFFICE.

DAVID WILSON, OF SPOKANE, WASHINGTON.

NUT-LOCK.

No. 915,642.     Specification of Letters Patent.     Patented March 16, 1909.

Application filed August 20, 1908. Serial No. 449,479.

*To all whom it may concern:*

Be it known that I, DAVID WILSON, a citizen of the United States, residing at Spokane, in the county of Spokane and State of Washington, have invented certain new and useful Improvements in Nut-Locks, of which the following is a specification, reference being had to the accompanying drawings.

This invention relates to improvements in nut-locks and consists of the novel details of construction hereinafter described and claimed.

The object of the invention is to provide a simple, inexpensive and efficient nut-locking washer constructed of a single piece of flexible sheet metal and having spurs to lock it to a wooden or other object and a plurality of radial tongues adapted to be bent up to engage the sides of a nut to lock the latter against rotation.

In the drawings, Figure 1 is a side view of a bolt showing the manner of engaging the present nut-lock thereto and engaging the same with a nut and the material with which the bolt is engaged; Fig. 2 is a perspective view of the nut-lock showing parts in a position when engaged with a nut; and Fig. 3 is a perspective view of the nut-lock before it has been bent to engage a nut.

Having thus described the invention what is claimed is:

Referring to the drawings, there is shown in dotted lines in Fig. 1, beams or other objects to be clamped, A and B, through which is passed a bolt C, having the usual head D and the threaded end E, to receive a nut F.

The nut lock comprises a washer plate formed from a single piece of flexible sheet metal, and has a body portion 2, in which is formed an opening 3, to receive the bolt C. The plate thus serves as a washer for the nut and the body portion above referred to is of substantially the same width as the nut.

As a means for locking the nut to the washer plate, I have provided the body portion 2 with radially projecting tongues 4, which are equally spaced and are located substantially at right angles to each other. These locking tongues are adapted to be turned up against the sides of the nut, and the body portion 2 is of such width that the locking tongues 4 when turned against the sides of the nut, are substantially parallel thereto, and in contact with the side of the nut. The locking tongues will therefore, firmly engage the nut and prevent all rotation of the nut relative to the washer plate. As a means for locking the washer plate from turning, I have cut away the material between each pair of the locking tongues so as to form pointed spurs which project radially from the body portion of the washer. Said spurs are each bent downward and lie in a plane which is substantially at right angles to a radial plane passing centrally through said spurs. The spurs are also located substantially at right angles to the body portion of the washer. The spurs are so disposed that as the nut is turned, the extreme outer portions or corners of the nut will pass over the washer plate directly above the spurs. It will readily be seen therefore, that when the nut is turned on to the bolt, pressure is applied to the washer directly over the spurs and the spurs will be embedded in the structure being clamped by the bolt. It will also be seen that the spurs lying in a plane at right angles to a radial plane passing through the spur is so disposed that the rotating strain placed on the washer is in the plane of the spur which greatly strengthens the grip of the washer plate on the object in which the spurs are embedded.

Having thus described the invention what is claimed is:

The herein described nut lock, comprising a washer plate formed of a single piece of flexible sheet metal having a body portion with a central opening to receive the bolt, equally spaced locking tongues projecting radially from the body portion and adapted to be bent up parallel to and into contact with the sides of the nut, the adjacent tongues being located substantially at right angles to each other, the material between the tongues being cut away to form pointed spurs projecting radially from the body portion, each of said spurs being bent at substantially right angles to the body portion and lying in a plane at right angles to a radial plane passing centrally through said spur, said spurs being disposed within the extreme outer portions of the nut, whereby as the nut is turned pressure is applied to the washer directly over said spurs.

In testimony whereof I hereunto affix my signature in the presence of two witnesses.

DAVID WILSON.

Witnesses:
   T. M. TERRY,
   H. F. McQUAY.